United States Patent [19]

Cicchelli

[11] Patent Number: 4,901,861

[45] Date of Patent: Feb. 20, 1990

[54] ASYNCHRONOUS FRUIT SORTER APPARATUS

[75] Inventor: Martin D. Cicchelli, Durham, N.C.

[73] Assignee: Clayton Durand Manufacturing Company, Durham, N.C.

[21] Appl. No.: 313,796

[22] Filed: Feb. 22, 1989

[51] Int. Cl.$^4$ ............................ B07C 5/02; B07C 5/36
[52] U.S. Cl. .................................. 209/539; 198/690.2; 198/846; 209/588; 209/914; 209/923; 209/934
[58] Field of Search ................ 209/539, 576, 577, 580, 209/581, 582, 587, 588, 914, 923, 934, 939; 198/579, 461, 836, 690.2, 698, 699, 844, 846

[56] References Cited

U.S. PATENT DOCUMENTS

| | | | |
|---|---|---|---|
| 3,565,249 | 2/1971 | Codding | 209/587 X |
| 3,675,769 | 7/1972 | Story | 209/577 |
| 3,770,111 | 11/1973 | Greenwood et al. | 209/923 X |
| 3,773,172 | 11/1973 | McClure et al. | 209/588 X |
| 4,035,636 | 7/1977 | Tengsater | 209/588 X |
| 4,146,135 | 3/1979 | Sarkar et al. | 209/580 |
| 4,204,950 | 5/1980 | Burford, Jr. | 209/558 |
| 4,221,297 | 9/1980 | Arlanda-Lopez et al. | 209/576 |
| 4,246,098 | 1/1981 | Conway et al. | 209/558 |
| 4,279,346 | 7/1981 | McClure et al. | 209/582 |
| 4,726,898 | 2/1988 | Mills et al. | 209/545 |
| 4,735,323 | 4/1988 | Okada et al. | 209/582 |

Primary Examiner—Donald T. Hajec
Attorney, Agent, or Firm—Richard E. Jenkins

[57] ABSTRACT

The present invention relates to a high speed asynchronous fruit sorter, particularly suitable for pit scanning of cherries in order to segregate cherries containing pits from pitted cherries. In a conventional fruit sorting apparatus including a plurality of driven conveyor belts arranged in a cascading configuration wherein the conveyor belts each have laterally spaced and longitudinally extending fruit receiving channels across the width thereof, an optical detection system operatively associated with the last conveyor belt, and an air ejection system so as to optically scan each article of fruit being conveyed and eject unsatisfactory fruit from the sorter with an air pulse, the improvement of providing novel and enhanced fruit control and scanning capability by incorporating vertically raised fruit receiving channels into the last conveyor belt of the sorter to facilitate both horizontal and vertical optical scanning of each article of fruit and further providing a plurality of spaced guide bars above each of the conveyor belts for entraining articles of fruit onto the fruit receiving channels of the conveyor belts therebeneath.

10 Claims, 3 Drawing Sheets

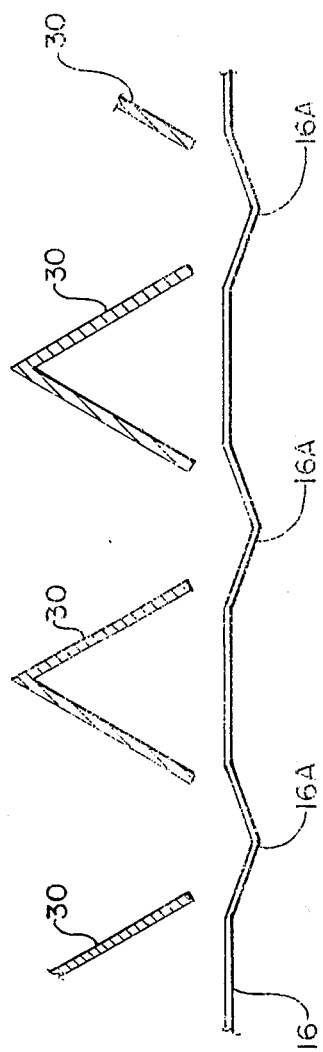

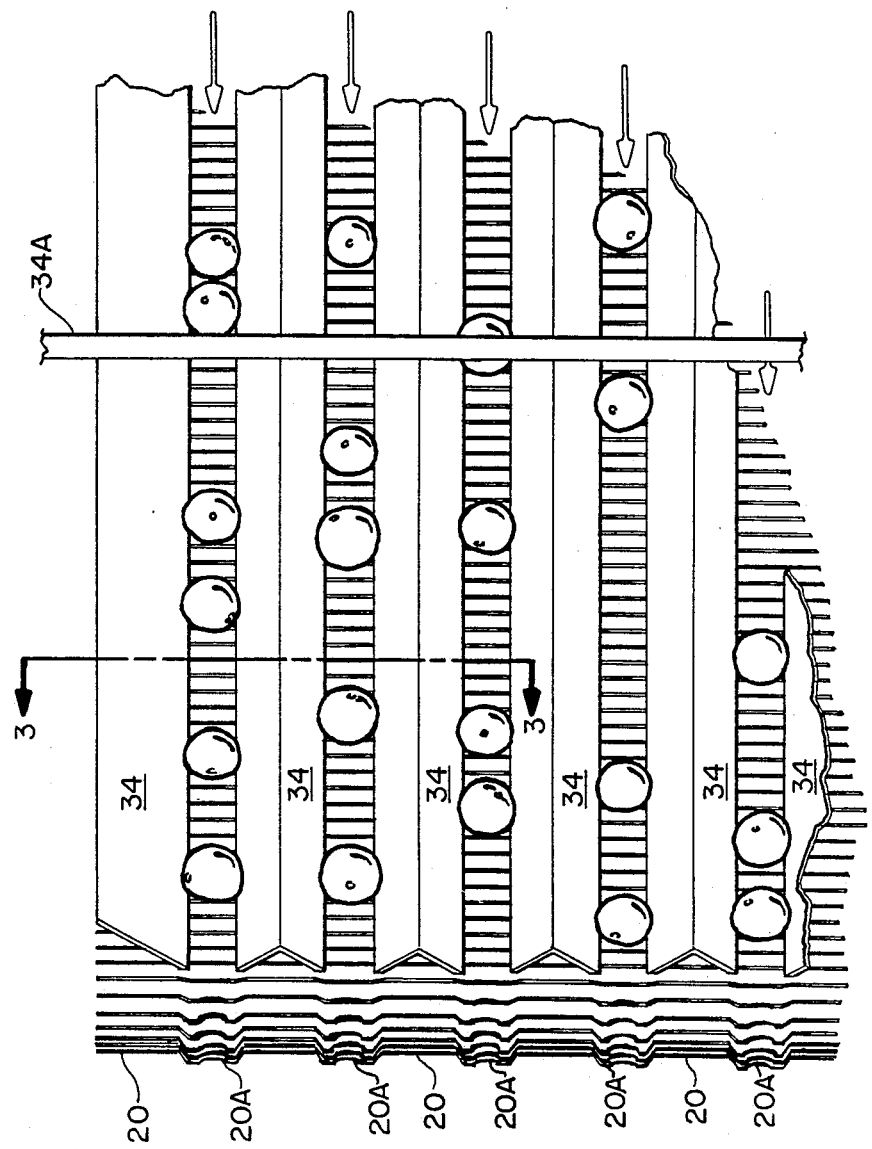

ASYNCHRONOUS FRUIT SORTER APPARATUS

DESCRIPTION

1. Technical Field

The present invention relates to fruit sorting and conveying systems and more particularly to an improved asynchronous fruit sorting apparatus that evaluates aligned and randomly spaced articles of fruit, such as scanning "pitted" cherries for the presence of an occasional cherry pit and segregating the cherries with pits from the pitted cherry product.

2. Background Art

Asynchronous fruit sorting apparatus are known although the state of the art in asynchronous fruit sorting apparatus presently only provides equipment which is not fully satisfactory in its performance. The art of asynchronous fruit sorting apparatus is probably best evidenced at this time by U.S. Pat. No. 4,279,346 to McClure et al. In the McClure et al. patent (assigned to Southeastern Blueberry Council, Inc. of Goldsboro, N.C.) a high speed blueberry sorter is disclosed that includes a driven wire-type conveyor having a series of laterally spaced and longitudinally extending conveying channels provided substantially in the plane of the conveyor. A vertically configured optical scanning system is provided so as to make a differential optical density reading of the blueberries as they are conveyed in aligned but randomly spaced configuration through the sorting zone provided by the conveyor, and an air jet sorting system is utilized to eject both overripe and underripe blueberries from the input channel of the conveyor to either an adjacent channel on one side thereof for overripe blueberries or an adjacent channel on the other side thereof for underripe blueberries. Thus, the blueberries have been sorted by the time they reach the discharge end of the conveyor into ripe, overripe and underripe berries which are then deposited into corresponding receptacles. An adjacent infeed conveyor is provided for depositing blueberries onto the sorting conveyor, and it preferably is constructed with similar laterally spaced channels which correspond to the channels of the sorting conveyor. Also, a transverse inverted V-shaped profile shield is provided over the infeed conveyor which is intended to position blueberries received from a hopper into the channels in the infeed conveyor.

While the McClure et al. apparatus disclosed in U.S. Pat. No. 4,279,346 was in concept a satisfactory asynchronous blueberry sorting apparatus, the apparatus proved in practice to have severe limitations in performance which are well known to applicant and others familiar therewith. When blueberries are processed by the apparatus, it was found that there was a tendency for the machine to scatter them all about due to a lack of control of the blueberry product being processed. The scattering appeared primarily to occur at the sorting conveyor and resulted in unsatisfactory sorting of ripe versus overripe and underripe blueberries. It is believed that the unsatisfactory performance of the apparatus was due to a lack of sufficient control over the blueberries as they were conveyed through the sorting apparatus. Also, the ability to take only a vertical differential optical density reading for each article of fruit resulted in imperfect assessment of the fruit by the optical maturity measuring system of the apparatus and aggravated the problem of incorrect sorting into the proper ripe versus overripe and underripe classifications. Thus, the prior art asynchronous blueberry sorter of McClure et al. has been found to be unsatisfactory due to inherent design limitations with respect to both maintaining control and optical scanning of articles of fruit being processed therethrough.

DISCLOSURE OF THE INVENTION

In accordance with the present invention, applicant provides a high speed asynchronous fruit sorting apparatus with improved sorting and scanning capabilities when compared to previously known fruit sorting apparatus. The apparatus known in the art is a high speed asynchronous fruit sorting apparatus for sorting aligned and randomly spaced articles of fruit according to whether each article of fruit is satisfactory and is of the type comprising a plurality of driven conveyor belts arranged in a cascading configuration so that the conveyor belts drop the articles of fruit successively from one conveyor belt to the next successive conveyor belt. The conveyor belts each have a plurality of spaced and longitudinally extending fruit receiving channels extending transversely thereacross, and an optical scanning and detection system is operatively associated with the last of the conveyor belts which is adapted to scan each article of fruit to determine whether it is satisfactory. An air ejection system is also operatively associated with the last conveyor belt and the optical detection system for addressing each of the articles of fruit by either allowing the fruit to proceed to the end of the last conveyor belt or ejecting it with an air pulse in accordance with the evaluation made thereof by the optical detection system.

Applicant's improvement to the above-described fruit sorting apparatus known in the art comprises providing a plurality of vertically raised fruit receiving channels in the last conveyor belt of the sorter apparatus to facilitate both horizontal as well as vertical optical scanning of each of the articles of fruit carried thereby for improved optical measurement. Applicant's sorter apparatus further provides sorting means above each of the plurality of conveyor belts for directing and entraining the articles of fruit onto the fruit receiving channels of each of said plurality of conveyor belts. In this fashion, both improved control over the articles of fruit and improved scanning capability is provided to a fruit sorting apparatus which results in significantly improved sorting performance and reliability.

It is therefore the object of the present invention to provide an asynchronous fruit sorter apparatus with substantially improved sorting capability and reliability.

A further object of the present invention is to provide a high speed asynchronous pit scanning apparatus for cherries that is capable of accurately sorting cherries with a pit from pitted cherry product with great accuracy and reliability.

A still further object of the present invention is to provide a high speed asynchronous fruit sorter apparatus which provides improved alignment of and control over articles of fruit on the conveyor belts and more accurate optical scanning of the articles of fruit on the last conveyor belt.

Still a further object of the present invention is to provide a high speed asynchronous pit scanning apparatus for cherries which is capable of reliable and accurate performance in commercial operation.

Some of the objects of the invention having been stated, other objects will become evident as the description proceeds, when taken in connection with the accompanying drawings.

BRIEF DESCRIPTION OF THE DRAWINGS

FIG. 1a is a fragmentary vertical cross sectional view of the first conveyor,

FIG. 2 is a fragmentary top plan view of the last conveyor belt and the guide bars or singulators provided thereabove (but omitting the optical scanning system) for entraining articles of fruit onto the fruit receiving channels of the conveyor belt.

BEST MODE FOR CARRYING OUT THE INVENTION

Figure 1:
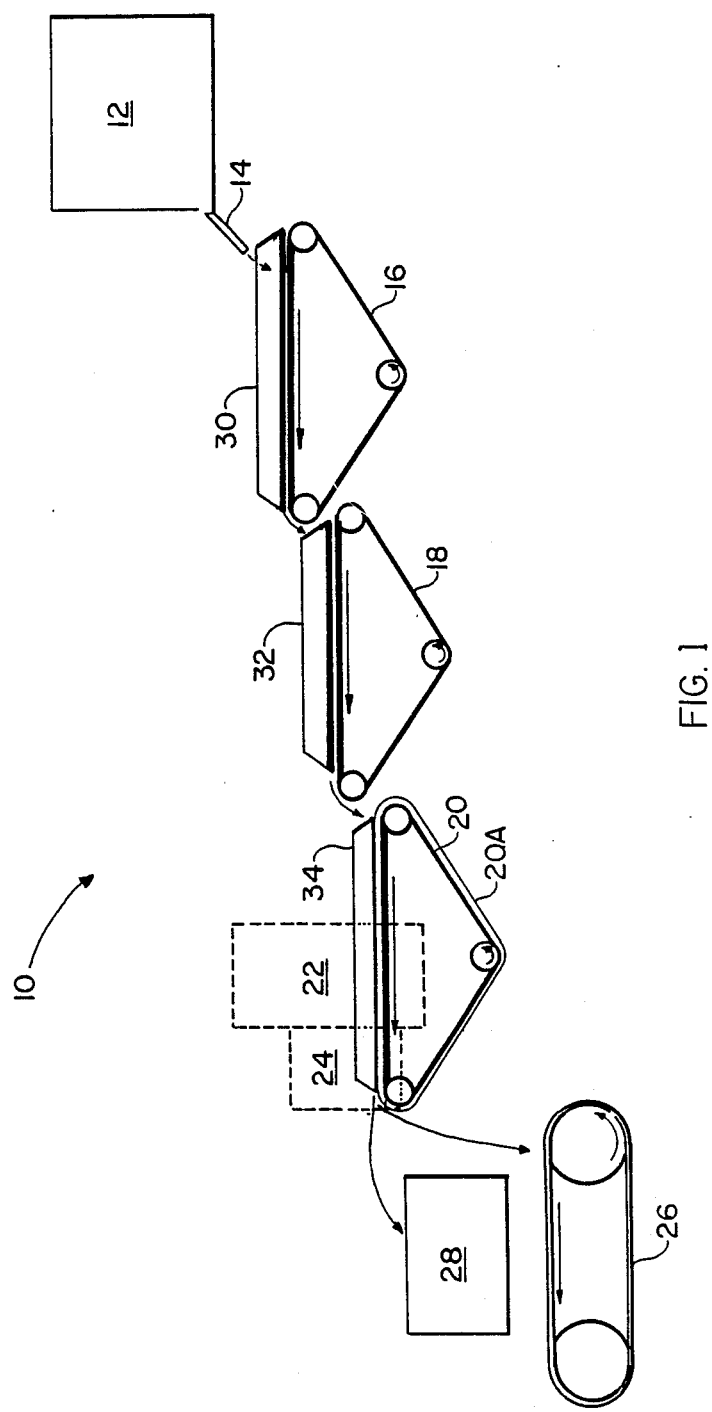
FIG. 1 is a schematic illustration of the high speed asynchronous fruit sorter of the present invention.

Referring now more specifically to the drawings, a preferred embodiment of a high speed asynchronous fruit sorting apparatus according to the present invention is shown in FIG. 1 and indicated generally by the numeral 10. It should be understood that throughout the following specification the asynchronous fruit sorter 10 will be referred to as a cherry pit scanning sorter since it was primarily designed to scan "pitted" cherry product (cherries with the pits removed) for the presence of an occasional cherry containing a pit. However, the asynchronous sorter 10 can be used to sort other fruits such as olives, prunes, and the like. Generally, it is contemplated that cherries would require a water bath to move from a hopper to the first conveyor belt of fruit sorter 10 whereas olives could be transported by gravity feed over a fixed chute and prunes would require a moving conveyor-type feed from a hopper to the first conveyor belt of fruit sorter 10.

With reference to sorter 10 as shown in the schematic drawing of FIG. 1, a hopper 12 is provided to contain the pitted cherries or other fruit which it is desired to sort. From hopper 12 the cherries descend down water bath ramp 14 to first conveyor belt 16 and successively therefrom to second conveyor belt 18 and third conveyor belt 20. All of the conveyor belts are positively driven such that the linear speed of each successive conveyor is relatively greater than that of the preceding conveyor belt. An optical scanning system 22 is provided to scan individual cherries while the cherries are being conveyed by third conveyor belt 20, and an air ejection system 24 is also provided at third conveyor belt 20 to emit an air pulse in order to eject any cherry which has been determined to be unsatisfactory (contain a pit) by optical scanning system 22. The good cherry product (or cherries that have been determined not to possess a pit) are allowed to fall onto packaging conveyor 26 for transportation to a station to be packaged and unsatisfactory cherries are air ejected into receptacle 28 where they are collected in segregated fashion from the good cherries. Although many design configurations are believed possible, applicant presently contemplates that asynchronous sorter 10 will utilize at least 3 conveyor belts of successively increasing linear speed and thus provide a minimum of 4 cherry drops from hopper 12 to packaging conveyor 26. Although 3 conveyor belts is presently believed to be an optimal sorter configuration, it is believed that a 4 or 5 conveyor belt apparatus having, 5 or 6 cherry drops would also be quite suitable for sorting articles of fruit.

Still with reference to FIG. 1 and FIG. 1a, it should be appreciated that first conveyor belt 16 is constructed so as to define a plurality of laterally spaced and longitudinally extending fruit receiving channels 16a therein across the width of the conveyor belt. The fruit receiving channels extend parallel to the running length of conveyor belt 16 and would normally be V-shaped channels or indentations positioned substantially within the plane defined by conveyor belt 16. Although a matter of design choice, it is believed that an optimal design for conveyor belt 16 is to include about 6 to 10 V-shaped channels across the width thereof although conceivably up to 24 channels could be utilized by conveyor belt 16 having a width of about 30 inches. Second conveyor belt 18 also would most suitably define a similar configuration of V-shaped fruit receiving channels (not shown) which would be in linear alignment with those of first conveyor belt 16 so cherries dropping from the fruit receiving channels of conveyor belt 16 onto second conveyor belt 18 would tend to be received by the aligned V-shaped channels of second conveyor belt 18.

Figure 3:
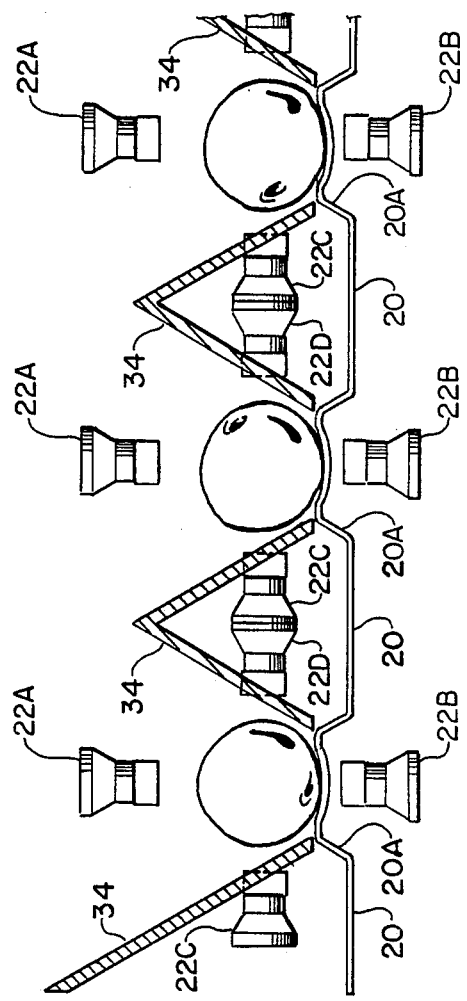
FIG. 3 is a sectional view taken along the lines 3—3 of FIG. 2 better illustrating the vertically raised fruit receiving channels of the last conveyor belt and the guide bars thereabove for entraining articles of fruit onto the fruit receiving channels.

Very importantly, and with reference now to FIGS. 1 and 3, it can be seen that third conveyor belt 20 defines a plurality of vertically raised fruit receiving channels 20A which are most suitably in linear alignment with the V-shaped fruit receiving channels of preceding conveyor belts 18 and 16, respectively. Vertically raised fruit receiving channels 20A of third and last conveyor belt 20 are configured so as to allow for horizontal optical scanning in addition to vertical optical scanning. The optical scanning used with the apparatus of the invention may be of various types known in the art, although infrared electro-optical scanning is preferred to detect pitted cherries in the preferred embodiment of the invention described herein. Thus the novel construction of conveyor belt 20 allows for vertical and horizontal scanning at each raised fruit receiving channel 20A of conveyor belt 20 by an optical pulse from vertical emitter 22A positioned above raised channel 20A and which is received by vertical detector 22B positioned in the crown of raised channel 20A. Simultaneously, a second optical pulse is generated by horizontal emitter 22C which is detected by horizontal detector 22D. In this fashion, optical scanning system 22 adjacent the terminal end of conveyor belt 20 detects the presence of a cherry on raised channel 20A and horizontally and vertically optically scans the cherry for the presence or absence of a pit therein as determined by processing of optical scanning signals by optical scanning system 22 in a manner which is generally well known in the art.

It should be emphasized, however, that applicant's novel raised channels 20A which facilitate the high degree of accuracy provided by both horizontal and vertical optical scanning by optical scanning system 22 are intended for use with any type of optical scanning best suited for sorting of a particular fruit product. Also, with reference to FIG. 3, although applicant has described only optical scanning of a cherry at a single vertically raised fruit receiving channel 20A of belt 20, each of the remaining raised channels 20A extending across the width of conveyor belt 20 also have operatively associated vertical scanning emitters and detectors, 22A and 22B, respectively, and horizontal scanning emitters and detectors, 22C and 22D, respectively.

Optical scanning system 22 is operatively connected to a conventional air ejection system 24 which provides for an air ejector (not shown) beneath each vertically raised channel 20A adjacent the terminal end of conveyor belt 20 to be selectively actuated to emit an air pulse to eject unsatisfactory cherries from conveyor belt 20 into receptacle 28. Satisfactory or pitted cherries are not ejected by air ejection system 24 and thus are allowed to be dropped from conveyor belt 20 onto flat packaging conveyor belt 26 which is preferably constructed of a resilient material.

With reference now to all of FIGS. 1–3, applicant wishes to describe in detail and provide a complete understanding of another novel feature of improved sorter 10 in addition to raised channels 20A of conveyor belt 20. Firstly, it should be appreciated that the apparatus disclosed in McClure et al. U.S. Pat. No. 4,279,346 has an inherent tendency to scatter blueberries all around the apparatus environment due to a lack of control over the blueberries as they are cascaded onto the primary driven conveyor belt thereof for optical scanning. By contrast, applicant's apparatus provides for complete control over the cherries which are processed therethrough for purposes of sorting. This is accomplished in large measure due to "singulator" bars or guide bars which are provided over each conveyor belt in order to entrain the cherries in an aligned and randomly spaced array onto the fruit receiving channels of each of the conveyor belts and, at the last conveyor belt, to also maintain the cherries in a circumscribed position for most accurate scanning thereof by optical scanning system 22. Specifically, first conveyor belt 16 is provided with guide bars 30, second conveyor belt 18 is provided with guide bars 32, and third conveyor belt 20 is provided with guide bars 34. With particular attention now to FIGS. 2 and 3, it can be seen that each set or plurality of guide bars, 30, 32 and 34, respectively, comprises a plurality of inverted V-shaped guide bars positioned in spaced-apart relation above corresponding conveyor belts 16, 18, and 20, respectively. Guide bars 30, 32 and 34 are most suitably substantially identical and thus can all be understood with reference to guide bars 34 as shown in detail in FIGS. 2 and 3. The plurality of guide bars 34 are positioned above conveyor belt 20 in spaced relationship across the width of the belt and parallel to fruit receiving channels 20A so that when cherries or other articles of fruit cascade downwardly thereon the guide bars 34 serve to singulate and entrain the articles of fruit onto fruit receiving channels 20A which are in vertical registration with slots defined between spaced guide bars 34. Thus, cherries fall onto guide bars 34 and are quickly directed and entrained onto each of the vertically raised fruit receiving channels 20A of conveyor belt 20. It is critical to proper control of the cherries during processing by sorter 10 that control be maintained over the fruit at each of conveyor belts 16, 18, and 20 so that the cherries will not be scattered from the apparatus and will ultimately be properly positioned on fruit receiving channels 20A to be scanned by optical scanning system 22. It should further be again emphasized that the present invention contemplates providing guide bars over each conveyor belt of sorter 10 in order to assure proper and continuous control of cherries being processed and high efficiency of operation of sorter 10. Each set or plurality of guide bars or singulators, 30, 32 and 34, respectively, associated with conveyor belts 16, 18, and 20, respectively, should be secured by at least one support arm (34A in FIGS. 2 and 3) above the conveyor belt travelling therebeneath and define slots therebetween which are in vertical registration with the channels in the belt traveling therebeneath.

Although it is contemplated that the novel elements of sorter 10 may be constructed from a variety of different materials and with a variety of differing dimensions, most preferably conveyor belts 16, 18, and 20 are fabricated of mesh stainless steel belts and corresponding guide bars 30, 32 and 34 are fabricated of stainless steel. With reference to FIG. 3, it is preferred that vertically raised fruit receiving channels 20A be elevated about ⅜ to ½ inch above the plane of conveyor 20 and define a recess in the top portion thereof of about ⅛ to 5/32 inch in depth. As noted earlier, it is further contemplated that preferably 6 to 10 vertically raised fruit receiving channels 20A will be defined across conveyor belt 20 which preferably has a width of about 30 inches. Also, although only conveyor belt 20 utilizes vertically raised fruit receiving channels 20A in the preferred embodiment of the invention depicted herein, it is contemplated that conveyor belts 18 and 16 could also incorporate vertically raised fruit receiving channels rather than the conventional V-shaped channels described hereinabove. Finally, it is believed by applicant that at least 3 conveyor belts and corresponding guide bars therefor are necessary for proper functioning of improved fruit sorter 10, and it is further contemplated that additional conveyor belts and guide bars therefor can be incorporated into sorter 10 so long as the last conveyor belt utilizes vertically raised fruit receiving channels in order to facilitate the highly desirable vertical and horizontal scanning yapability of the present apparatus.

It will be understood that various details of the invention may be changed without departing from the scope of the invention. Furthermore, the foregoing description is for the purpose of illustration only, and not for the purpose of limitation—the invention being defined by the claims.

What is claimed is:

1. In a high speed asynchronous fruit sorting apparatus for sorting aligned and randomly spaced articles of fruit according to whether each article of fruit is satisfactory and comprising a plurality of driven conveyor belts arranged in a cascading configuration so that said conveyor belts drop fruit successively from one conveyor belt to the next successive conveyor belt, said plurality of conveyor belts each having a plurality of laterally spaced and longitudinally extending fruit receiving channels each spaced transversely thereacross, an optical detection system operatively associated with a last one of said conveyor belts and adapted to scan, each article of fruit both horizontally and vertically to determine whether said article of fruit is satisfactory, and an air ejection system operatively associated with said last conveyor belt and said optical detection system for addressing each of said articles of fruit by either allowing satisfactory articles of fruit to proceed along said last conveyor belt or ejecting unsatisfactory articles of fruit from said conveyor with an air pulse, the improvement wherein said fruit receiving channels in at least said last conveyor belt comprise a plurality of vertically raised channels upon which the fruit rides and which are adapted to facilitate both horizontal and vertical optical scanning of each of said articles of fruit, and including sorting means above each of said plurality of conveyor belts for directing and entraining said articles of fruit onto said fruit receiving channels of said conveyor belts.

2. In a high speed asynchronous fruit sorting apparatus according to claim 1 wherein at least said last conveyor belt defines a substantially planar surface, and each of said vertically raised fruit receiving channels are elevated about ⅜ to ½ inch above said surface and define a recess in the top portion thereof about ⅛ to 5/32 inch in depth.

3. In a high speed asynchronous fruit sorting apparatus according to claim 1 wherein said last conveyor belt comprises between 6 and 24 vertically raised fruit receiving channels across the width thereof.

4. In a high speed asynchronous fruit sorting apparatus according to claim 1 wherein said plurality of conveyor belts consists of 3 conveyor belts wherein only the last conveyor belt comprises said plurality of vertically raised fruit receiving channels and the preceding conveyor belts comprise a plurality of non-elevated fruit receiving channels disposed substantially in the plane of each of said conveyor belts.

5. In a high speed asynchronous fruit sorting apparatus according to claim 1 wherein said sorting means comprises a plurality of inverted V-shaped guide bars positioned above and in spaced relationship across the width of each of said conveyor belts and extending parallel to the fruit receiving channels thereof, said plurality of inverted V-shaped guide bars defining a plurality of slots therebetween which are in substantial vertical registration with said fruit receiving channels on each of said conveyor belts, whereby cascading articles of fruit are entrained onto said fruit receiving channels on each of said conveyor belts for optical scanning at the last of said conveyor belts of said fruit sorting apparatus.

6. In a high speed asynchronous fruit sorting apparatus according to claim 5 wherein each of said plurality of inverted V-shaped guide bars are secured above a respective one of said conveyor belts by at least one support arm.

7. In a high speed asynchronous fruit sorting apparatus for sorting aligned and randomly spaced articles of fruit according to whether each article of fruit is satisfactory and comprising a plurality of driven conveyor belts arranged in a cascading configuration so that said conveyor belts drop fruit successively from one conveyor belt to the next successive conveyor belt, said plurality of conveyor belts each having a plurality of laterally spaced and longitudinally extending fruit receiving channels each spaced transversely thereacross, an optical detection system operatively associated with a last one of said conveyor belts and adapted to scan each article of fruit both horizontally and vertically to determine whether said article of fruit is satisfactory, and an air ejection system operatively associated with said last conveyor belt and said optical detection system for addressing each of said articles of fruit by either allowing satisfactory articles of fruit to proceed along said last conveyor belt or ejecting unsatisfactory articles of fruit from said conveyor with an air pulse, the improvement wherein said fruit receiving channels in at least said last conveyor belt comprise a plurality of parallel and vertically raised channels upon which said fruit rides and which are adapted to facilitate both horizontal and vertical optical scanning of each of said articles of fruit, and including a plurality of inverted V-shaped guide bars positioned above and in spaced relationship across the width of each of said conveyor belts and extending parallel to the fruit receiving channels thereof for directing and entraining said articles of fruit onto said fruit receiving channels of said conveyor belts, said plurality of inverted V-shaped guide bars defining a plurality of slots therebetween which are in substantial vertical registration with said fruit receiving channels on each of said conveyor belts, whereby cascading articles of fruit are entrained onto said fruit receiving channels on each of said conveyor belts for optical scanning at the last of said conveyor belts of said fruit sorting apparatus.

8. In a high speed asynchronous fruit sorting apparatus according to claim 7 wherein at least said last conveyor belt defines a substantially planar surface, and each of said comprises vertically raised fruit receiving channels are elevated about ⅜ to ½ inch above said surface and define a recess in the top portion thereof about ⅛ to 5/32 inch in depth.

9. In a high speed asynchronous fruit sorting apparatus according to claim 7 wherein said last conveyor belt comprises between 6 and 24 vertically raised fruit receiving channels across the width thereof.

10. In a high speed asynchronous fruit sorting apparatus according to claim 7 wherein said plurality of conveyor belts consists of 3 conveyor belts wherein only the last conveyor belt comprises said plurality of vertically raised fruit receiving channels and the preceding conveyor belts comprise a plurality of non-elevated fruit receiving channels disposed substantially in the plane of each of said conveyor belts.

* * * * *